US008810651B2

(12) United States Patent
Calnegru

(10) Patent No.: US 8,810,651 B2
(45) Date of Patent: Aug. 19, 2014

(54) PSEUDO-COLOR COVERT NIGHT VISION SECURITY DIGITAL CAMERA SYSTEM

(75) Inventor: Cristian M. Calnegru, Surrey (CA)

(73) Assignee: Honeywell International, Inc, Morristown, NJ (US)

( * ) Notice: Subject to any disclaimer, the term of this patent is extended or adjusted under 35 U.S.C. 154(b) by 1488 days.

(21) Appl. No.: 11/861,850

(22) Filed: Sep. 26, 2007

(65) Prior Publication Data

US 2009/0079825 A1  Mar. 26, 2009

(51) Int. Cl.
*H04N 7/18* (2006.01)

(52) U.S. Cl.
USPC ............ 348/143; 348/164; 348/33; 348/34; 348/70

(58) Field of Classification Search
USPC ............ 348/32–34, 65, 68–70, 164–168, 143
See application file for complete search history.

(56) References Cited

U.S. PATENT DOCUMENTS

| 4,261,344 | A | * | 4/1981 | Moore et al. ................. 600/109 |
| RE31,289 | E | * | 6/1983 | Moore et al. ................. 600/109 |
| 4,652,739 | A | * | 3/1987 | Sciamanda et al. ...... 250/214 LA |
| 4,707,595 | A | * | 11/1987 | Meyers ...................... 250/504 R |
| 4,724,354 | A | * | 2/1988 | Dill .............................. 313/371 |
| 4,991,183 | A | * | 2/1991 | Meyers .......................... 372/109 |
| 5,001,558 | A | * | 3/1991 | Burley et al. ................. 348/164 |
| 5,214,503 | A | * | 5/1993 | Chiu et al. ................. 348/217.1 |
| 5,241,170 | A | * | 8/1993 | Field et al. ............... 250/214 VT |
| H1599 | H | * | 10/1996 | Task et al. ........................ 348/33 |
| 5,806,955 | A | * | 9/1998 | Parkyn et al. ................. 362/612 |
| 6,158,879 | A | * | 12/2000 | Midgley ........................ 362/347 |
| 6,570,147 | B2 | * | 5/2003 | Smith ..................... 250/214 VT |
| 6,611,200 | B2 | * | 8/2003 | Pressnall et al. ........... 340/425.5 |
| 7,358,496 | B2 | * | 4/2008 | Fleury et al. .................. 250/332 |
| 8,212,876 | B2 | * | 7/2012 | Shamir et al. ................. 348/162 |
| 2002/0067560 | A1 | * | 6/2002 | Jones ........................... 359/885 |
| 2003/0093805 | A1 | * | 5/2003 | Gin .............................. 725/105 |
| 2004/0080627 | A1 | * | 4/2004 | Kroll et al. ................. 348/221.1 |
| 2005/0040333 | A1 | * | 2/2005 | Fleury et al. .................. 250/332 |
| 2005/0065406 | A1 | * | 3/2005 | Cline et al. .................... 600/160 |
| 2005/0200701 | A1 | * | 9/2005 | Jones ........................... 348/168 |
| 2008/0157000 | A1 | * | 7/2008 | Shamir et al. ............. 250/473.1 |

OTHER PUBLICATIONS

Grossman; Thermal Infrared vs. Active Infrared: A New Technology Begins to be Commercialized; http://web.archive.org/web/20070829061124/http://www.irinfo.org/Articles/03_01_2007_grossman.html.*

* cited by examiner

*Primary Examiner* — Jimmy H Tran
(74) *Attorney, Agent, or Firm* — Husch Blackwell LLP

(57) ABSTRACT

A digital security camera system and method for pseudo-color covert night vision is provided. The system includes one or more light sources adapted for providing selective illumination at a plurality of infrared wavelengths, such as 730 nm, 830 nm and 940 nm. A monochrome digital image capture device records multiple images of a target illuminated in the plurality of wavelengths and stored in a storage device. A processor retrieves the set of recorded images and assigns each wavelength to a specific color channel. The color channels are combined into a composite color image.

16 Claims, 3 Drawing Sheets

PSEUDO-COLOR COVERT NIGHT VISION SECURITY DIGITAL CAMERA SYSTEM

I. FIELD OF THE INVENTION

The present invention relates generally to security digital cameras. More specifically, the present invention relates to security digital cameras with pseudo-color covert night vision.

II. BACKGROUND OF THE DISCLOSURE

Security systems are often employed to secure office spaces, commercial sites, and parking lots. With many of these systems, digital surveillance cameras are used to monitor areas that are highly trafficked. The digital surveillance cameras are generally very good at tracking people going into and out of monitored areas.

Digital cameras using CCD and CMOS image sensors are quite sensitive to infrared wavelengths. However, images captured using infrared illumination tend to be flat and lack definition. This lack of definition can be a problem when details need to be discerned from digital images.

Therefore, a need exists for a digital surveillance camera that captures images with improved definition.

III. SUMMARY OF THE DISCLOSURE

An object of the present invention is to provide a solution capable of creating a pseudo-color image during the nighttime using covert illumination to provide better object differentiation, resulting in clearer images which contains more information and/or details about the targets.

An embodiment of the present invention provides pseudo-color images during the night, while using covert illumination. The present embodiment provides multiple light sources emitting light ice the infrared region of the electromagnetic spectrum, a monochrome digital camera, a digital-processing device, and a switching device for continuously synchronizing the multiple infrared light sources with the digital processing device and camera. The end result is a pseudo-color digital image signal constructed from individual images captured under each wavelength of infrared light.

The digital security camera apparatus includes a first light source for generating light at a first discrete wavelength band for illuminating a target; a second light source for generating light at a second discrete wavelength band for illuminating the target; a third light source for generating light at a third discrete wavelength band for illuminating the target; a monochrome digital image capture device; a switching circuit for singly activating the first light source, the second light source and the third light source, and controlling the monochrome digital image capture device to sequentially capture images of the target illuminated by each of the plurality of discrete wavelength bands; a storage device for storing the captured images; a processor for retrieving the captured images from the storage device, individually assigning each of the plurality of discrete wavelength bands to one of a plurality of color channels, and combining the plurality of color channels to form a pseudo-color composite image.

Alternatively, the digital security camera apparatus includes a light source for generating light at a plurality of discrete wavelength bands for illuminating a target; a monochrome digital camera; a switching circuit for activating the light source for generating each of the plurality of discrete wavelength bands sequentially and controlling the monochrome digital camera to sequentially capture images of the target illuminated by each of the plurality of discrete wavelength bands; a storage device for storing the captured images; a processor for retrieving the captured images from the storage device, individually assigning each of the plurality of discrete wavelength bands to one of a plurality of color channels, and combining the plurality of color channels to form a pseudo-color composite image.

IV. BRIEF DESCRIPTION OF THE DRAWINGS

These and other features, aspects, and advantages of the present invention will become better understood with regard to the following description, appended claims, and accompanying drawings wherein:

V. DETAILED DESCRIPTION OF DISCLOSURE

Figure 1:
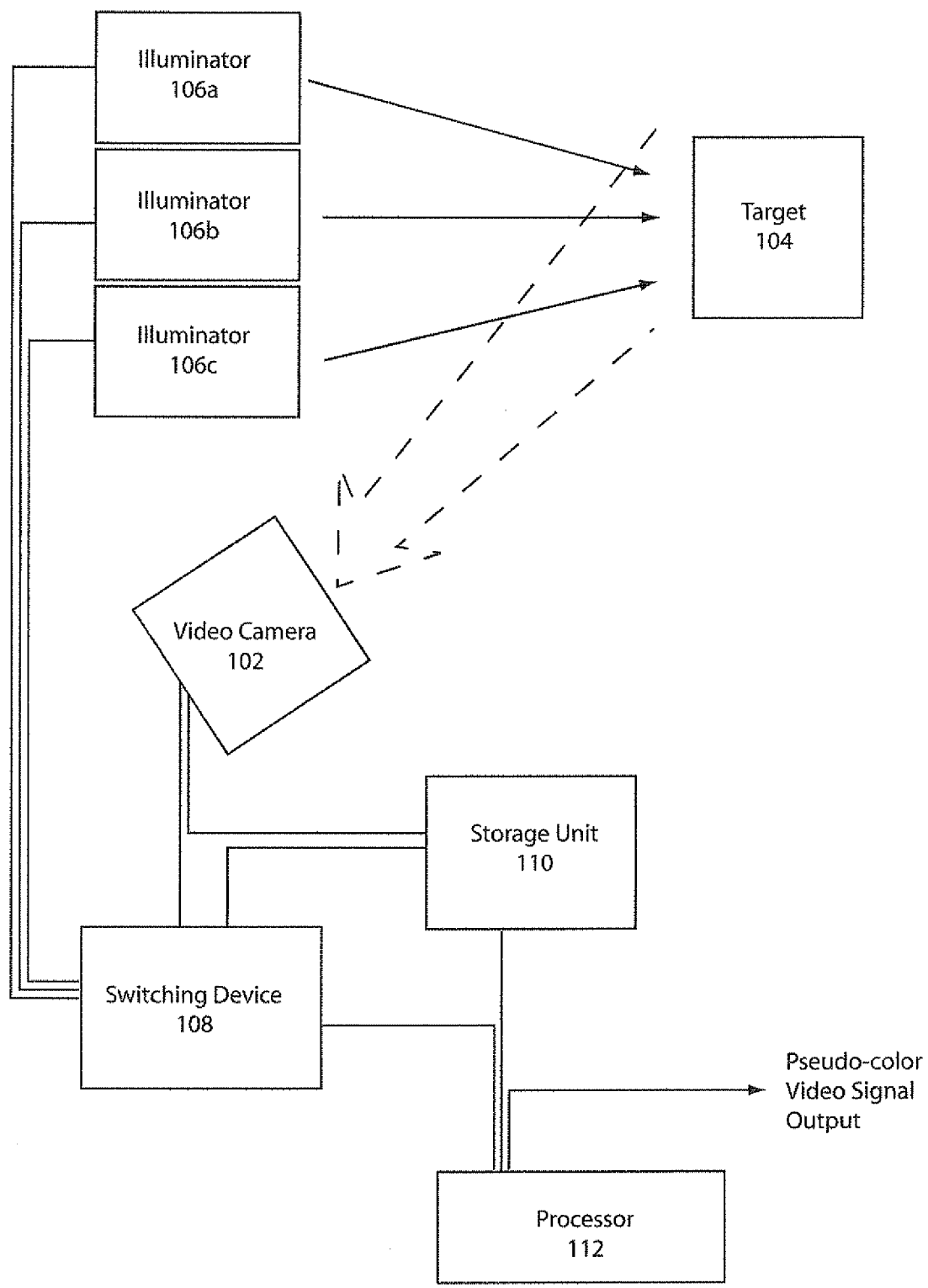
FIG. 1 illustrates a block representation of an embodiment of the present invention.

Referring to FIG. 1, in one embodiment of the present invention a monochrome digital camera 102 is positioned so as to capture images of a target area 104. A plurality of light sources 106a-106c are positioned to illuminate the target area 104. Each light source of the plurality of light sources 106a-106c emits a different wavelength of light. For example, one such embodiment may use light sources emitting light having central wavelengths of 730 nm, 830 nm and 940 nm. However, other discrete wavelengths in the infrared band may be used.

However, the present invention is not limited to only three light sources as shown in FIG. 1. Rather, any number of light sources may be used, each emitting a different wavelength of light in the non-visible regions of the electromagnetic spectrum. Alternatively, a tunable light source may be used that is capable of selectably emitting discrete wavelengths of infrared light.

A switching circuit 108 synchronizes the image capture and light source 106a-106c activation so that an individual image is captured for each activation of a light source 106a-106c. In other words, the switching circuit 108 controls the digital camera 102 to capture a first image when the target area 104 is illuminated by the first light source 106a, a second image when the target area 104 is illuminated by the second light source 106b, and a third image when the target area 104 is illuminated by the third light source 106c. After each image is captured by the digital camera 102, the data is stored in a storage device 110, such as a solid state memory, hard drive, optical disk, or other appropriate storage medium.

A processor 112 retrieves all the captured images stored in the storage device 110 once all the fight sources 106a-106c have been sequentially activated and the corresponding images captured. The processor 112 may receive a control signal from the switching circuit notifying the processor that a sequence of image captures has been completed and ready for processing. Alternatively, the processor 112 may operate essentially in parallel with the image capture such that as each image is captured and stored, the processor 112 retrieves the image and processes it. In this way the lag between generation of each composite image can be reduced.

The processor 112 assigns each captured image in a sequence to a specific color channel roughly corresponding to the wavelength emitted by the light source 106a-106c used for that image capture. Additionally, the processor 112 then combines the color channels into a composite, pseudo-color image. Any additional image processing that may need to be performed is also performed by the processor 112 to prepare the composite image for output to a display, printer or other output format. The processor 112 may be a single processor or a plurality of processors configured to perform individual tasks necessary for the present invention. The one or more processors are provided, the processors do not need to be housed together, but may be disposed within the camera housing, an external control box, and/or a computer workstation or server.

Figure 2:
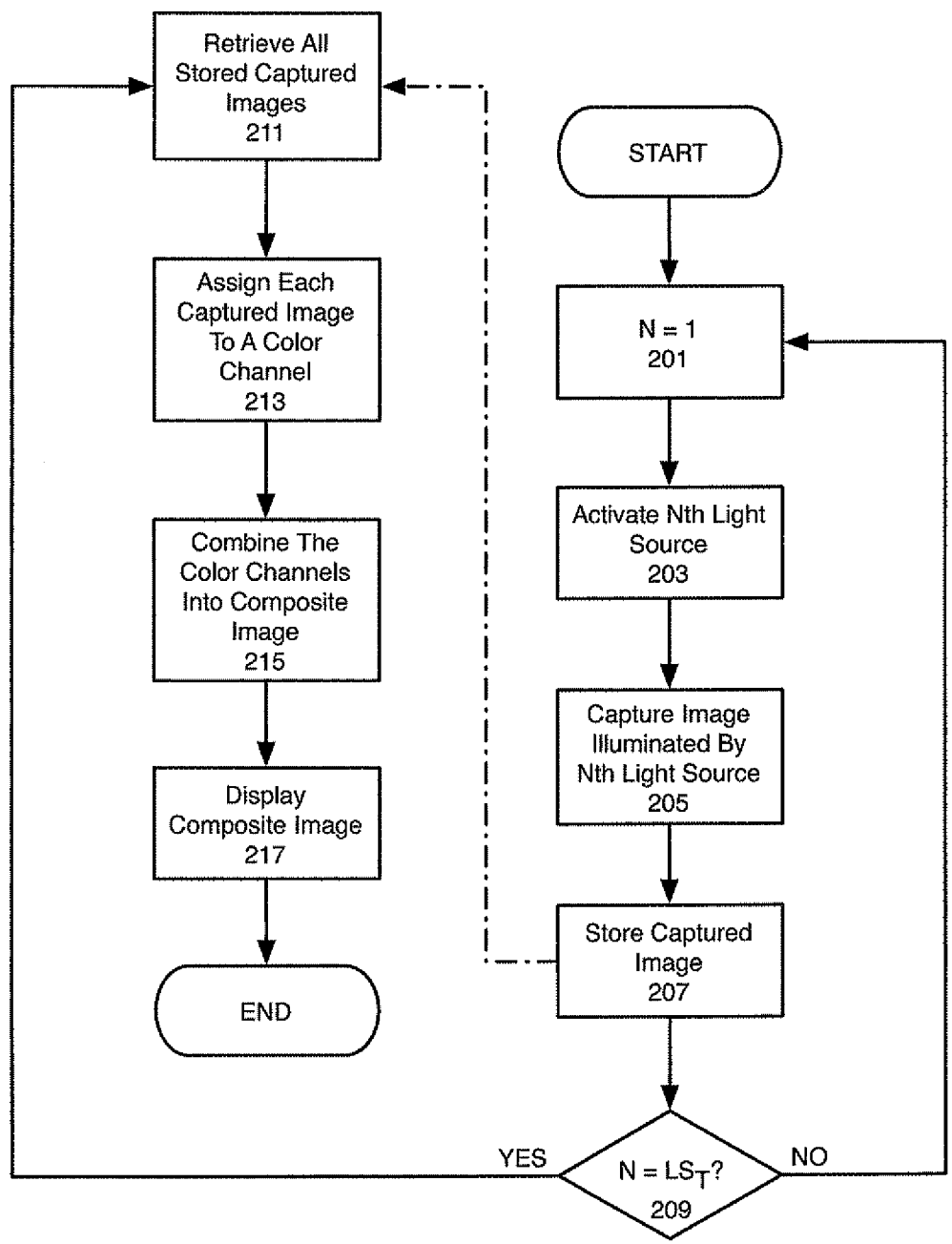
FIG. 2 illustrates a flow diagram of a process for performing an embodiment of the present invention.

Referring to FIG. 2, a process for providing a pseudo-color vision security camera system in accordance with the present invention is shown. Beginning at step 201, a selector, referenced as N, is set to select a first light source, or illuminator. The first light source is activated in step 203 and illuminates an area under surveillance. A security camera of the present invention captures an image of the area illuminated by the first light source in step 205. The captured image data is stored in a storage, such as a hard drive or solid state memory in step 207.

In step 209, if the selector value N is set to a value less than the total number of light sources ($LS_T$), the process returns to step 201 where the value of N is incremented by one. In this way, the next light source (i.e. the Nth light source) is selected. A plurality of light sources is provided in the present invention and thus the steps 201 through 207 are repeated for each of the provided light sources. However, if the selector value N is set to a value equaling the total number of light sources ($LS_T$) in step 209, the process proceeds to step 211.

Moving to step 211, the captured images stored in step 207 are retrieved, signified by the broken line leading from block 207 to block 211. Each of the captured images is assigned to an individual color channel in step 213. These individual channels colorize the assigned image based on the particular color of the channel. For example, an image assigned to a red color channel would be colorized in monochromatic red such that the gray levels of the image determine the lightness of the red values assigned. One set of color channels may be the common red, green and blue of an RGB colorspace. A second set that may be used in the present invention is cyan, magenta, and yellow used in a CMY colorspace. Other colorspaces may be used as well, which may have more or less channels. However the number of channels should equal the number of light sources used.

In one embodiment of the present invention, pseudo-color still images are produced using a still image digital camera. In another embodiment, a digital video camera is used so that the output is provided as a video stream. In the case where the digital camera is configured for capturing pseudo-color video, the present invention can be configured to provide pseudo-color video. In the video version, the digital camera captures multiple frames (three frames in the embodiment described above) for every pseudo-color frame displayed. Therefore, the frame rate of the output video is a fraction of the video camera's native monochrome frame rate. For Example, in the case where three light sources are used the output video frame rate is equal to ⅓ of the video camera's native frame rate.

A standard real-time video stream is generally streamed at a frame rate of between 24 and 30 fps (frames per second), thus ideally the digital video camera should be capable of capturing image frames at a frame rate of between 72 and 90 fps for the three light source embodiment discussed above. Slower frame rates may result in a choppy video. However, depending on the specific application, the choppiness produced by slower frame rates may not be a problem, for instance when multiple video camera feeds are sequentially displayed on a security monitor.

The switching circuit should be capable of switching between each light source at least at a rate equal to the desired output video frame rate multiplied by the number of light sources, hereinafter referred to as the raw frame rate, used to produce the composite pseudo-color image. Additionally, the switching circuit must control the capture of each video frame at the raw frame rate.

Preferably, the processor is capable of processing the captured monochrome frames and combining them into a composite frame in essentially real-time so that the lag between each output composite frame is minimized as much as possible.

These color channels are then combined into a composite image in step 215. In step 217, the composite image is displayed on a display screen for viewing by security personnel. Alternatively, the composite image may be formatted for output by a printer.

Figure 3:
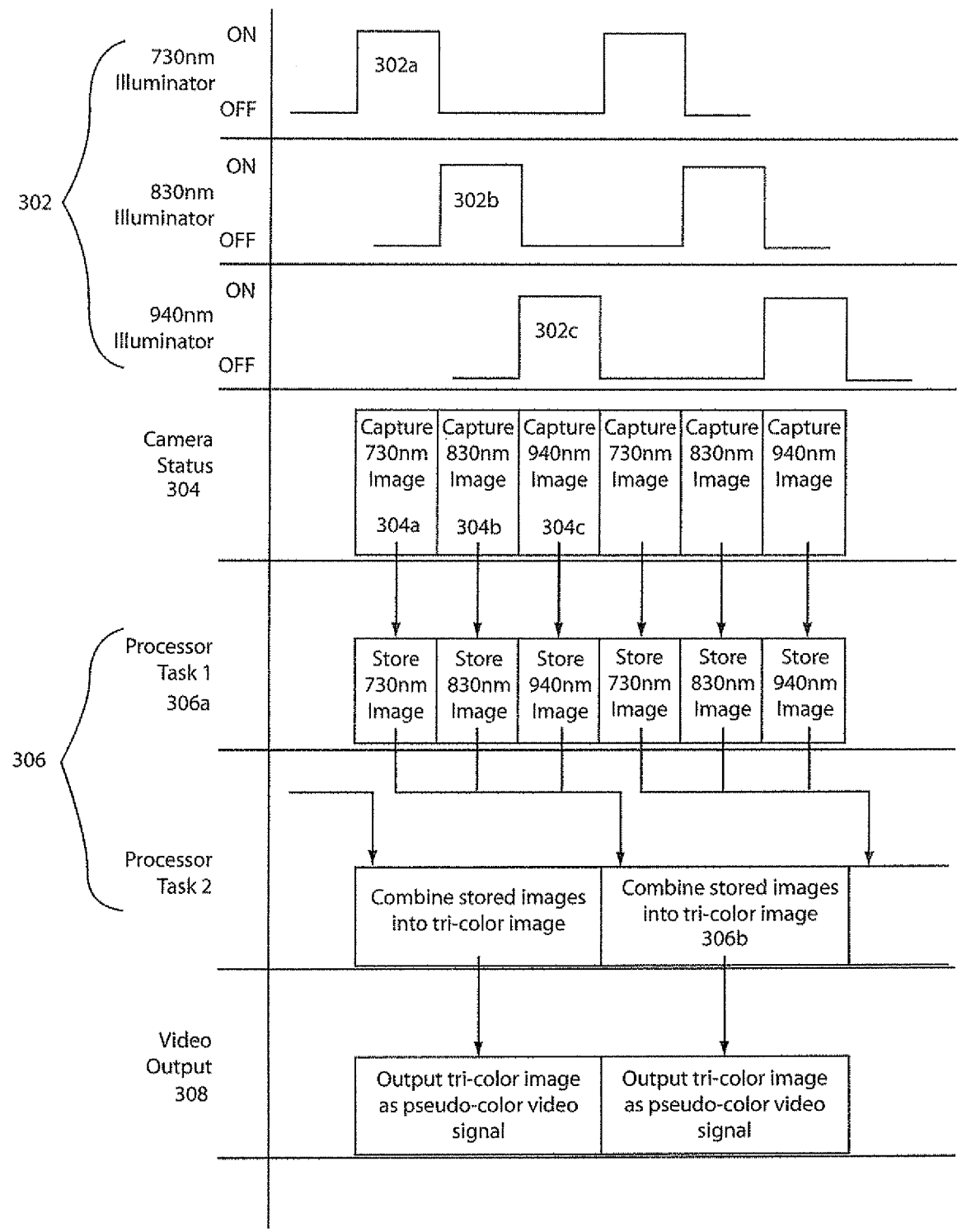
FIG. 3 illustrates a schematic representation of an embodiment of the present invention

Referring to FIG. 3, a schematic representation of an embodiment of the present invention is shown. As seen in FIG. 3, each of the three illuminators can be turned on in individual time intervals 302a, 302b, and 302c, respectively, as in 302. The time intervals can be repeated, but during each time interval 302a, 302b, and 302c, only one of the three illuminators is turned on.

In 304, the camera can capture images 304a, 304b, and 304c during the respective time intervals 302a, 302b, and 302c. Then, the captured images 304a, 304b, and 304c can be stored as in 306a. Also in 306, images from each of the three illuminators can be combined and stored as tri-color images. In some embodiments, three images from three different illuminators can be combined into one tri-color image. Then, each tri-color image can be output as a pseudo-color video signal as in 308.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A digital security camera apparatus comprising:
   a light source for generating light at a plurality of discrete wavelength bands for illuminating a target;
   a monochrome digital camera;
   a switching circuit for activating said light source for alternatively generating light at each of said plurality of discrete wavelength bands sequentially so the target is illuminated by light at only one of the plurality of discrete wavelength bands during a predetermined period of time and for controlling said monochrome digital camera to sequentially capture images of said target illuminated by light individually at each of said plurality of discrete wavelength bands;
   a storage device for storing said captured images; and
   a processor for retrieving said captured images from said storage device, for individually assigning each of said captured images to one of a plurality of color channels, for colorizing each of said captured images with one of a plurality of monochromatic colors associated with a respective assigned color channel, and for combining said colorized captured images to form a pseudo-color composite image,
   wherein a number of color channels in the plurality of color channels and a number of monochromatic colors in the plurality of monochromatic colors is equal to a number of discrete wavelength bands in the plurality of discrete wavelength bands.

2. The system as in claim 1, wherein said plurality of discrete wavelength bands are infrared wavelengths.

3. The system as in claim 2, wherein said plurality of discrete wavelength bands have central wavelengths of 730 nm, 830 nm and 940 nm.

4. The system as in claim 1, wherein said captured image illuminated by a first wavelength band of said plurality of discrete wavelength bands is assigned to a Blue color channel, illuminated by a second wavelength band of said plurality of discrete wavelength bands is assigned to a Green color channel and illuminated by a third wavelength band of said plurality of discrete wavelength bands is assigned to a Red color channel.

5. A method for providing a pseudo-color composite image, said method comprising:
  generating light at a plurality of discrete wavelength bands for illuminating a target;
  activating said light source for alternatively generating light at each of said plurality of discrete wavelength bands sequentially so the target is illuminated by light at only one of the plurality of discrete wavelength bands during a predetermined period of time;
  capturing monochrome images of said target illuminated by light individually at each of said plurality of discrete wavelength bands;
  storing said captured images in a storage device;
  processing said captured images stored in said storage device;
  retrieving said captured images from said storage device;
  assigning said captured images to one of a plurality of color channels;
  colorizing each of said captured images with one of a plurality monochromatic colors associated with a respective assigned color channel; and
  combining said colorized captured images to form a composite image having pseudo-color,
  wherein a number of color channels in the plurality of color channels and a number of monochromatic colors in the plurality of monochromatic colors is equal to a number of discrete wavelength bands in the plurality of discrete wavelength bands.

6. The method as in claim 5, wherein said plurality of discrete wavelength bands are infrared wavelength bands.

7. The method as in claim 5, wherein said plurality of discrete wavelength bands have central wavelengths of 730 nm, 830 nm and 940 nm.

8. The method as in claim 5, wherein said captured image illuminated by a first wavelength band of said plurality of discrete wavelength bands is assigned to a Blue color channel, illuminated by a second wavelength band of said plurality of discrete wavelength bands is assigned to a Green color channel and illuminated by a third wavelength band of said plurality of discrete wavelength bands is assigned to a Red color channel.

9. A digital security camera apparatus comprising:
  a first light source for generating light at a first discrete wavelength band for illuminating a target;
  a second light source for generating light at a second discrete wavelength band for illuminating said target;
  a third light source for generating light at a third discrete wavelength band for illuminating said target;
  a monochrome digital image capture device;
  a switching circuit for singly and alternatively activating said first light source, said second light source and said third light source so the target is illuminated by light from only of the first, second, or third light sources during a predetermined period of time, and controlling said monochrome digital image capture device to sequentially capture images of said target illuminated by light individually at each of said plurality of discrete wavelength bands;
  a storage device for storing said captured images; and
  a processor for retrieving said captured images from said storage device, for individually assigning each of said captured images to one of three color channels, for colorizing each of said captured images with one of three monochromatic colors associated with a respective assigned color channel, and for combining said colorized captured images to form a pseudo-color composite image.

10. The system as in claim 9, wherein said first discrete wavelength band, said second discrete wavelength band and said third discrete Wavelength band are infrared wavelength bands.

11. The system as in claim 10, wherein said first discrete wavelength band has a central wavelength of 730 nm, said second discrete wavelength band has a central wavelength of 830 nm and said third discrete wavelength band has a central wavelength of 940 rim.

12. The system as in claim 9, wherein said image captured under said first discrete wavelength band is assigned to a Blue color channel, under said second discrete wavelength band is assigned to a Green color channel and under said third discrete wavelength band is assigned to a Red color channel.

13. A method for providing a pseudo-color composite image, said method comprising:
  generating a first light at a first discrete wavelength band for illuminating a target with only the first light;
  generating a second light at a second discrete wavelength band for illuminating said target with only the second light;
  generating a third light at a third discrete wavelength band for illuminating said target with only the third light;
  capturing, sequentially, images of said target illuminated by light individually at each of said first discrete wavelength band, said second discrete wavelength band and said third discrete wavelength band;
  storing said captured images;
  retrieving said captured images from said storage device;
  individually assigning each of said captured images to one of three color channels;
  colorizing each of said captured images with one of three monochromatic colors associated with a respective assigned color channel; and
  combining said colorized captured images to form a pseudo-color composite image,
  wherein a number of color channels in the three color channels and a number of monochromatic colors in the three monochromatic colors is equal to a number of discrete wavelength bands in the three discrete wavelength bands.

14. The system as in claim 13, wherein said first discrete wavelength band, said second discrete wavelength band and said third discrete wavelength band are infrared wavelength bands.

15. The system as in claim 14, wherein said first discrete wavelength band has a central wavelength of 730 nm, said second discrete wavelength band has a central wavelength of 830 nm and said third discrete wavelength band has a central wavelength of 940 rim.

16. The system as in claim 13, wherein said image captured under said first discrete wavelength band is assigned to a Blue color channel, under said second discrete wavelength band is assigned to a Green color channel and under said third discrete wavelength band is assigned to a Red color channel.

* * * * *